July 6, 1926.

G. F. DE WEIN

POPPET VALVE

Filed April 25, 1921

Inventor:

July 6, 1926.
G. F. DE WEIN
POPPET VALVE
Filed April 25, 1921 2 Sheets-Sheet 2
1,591,935
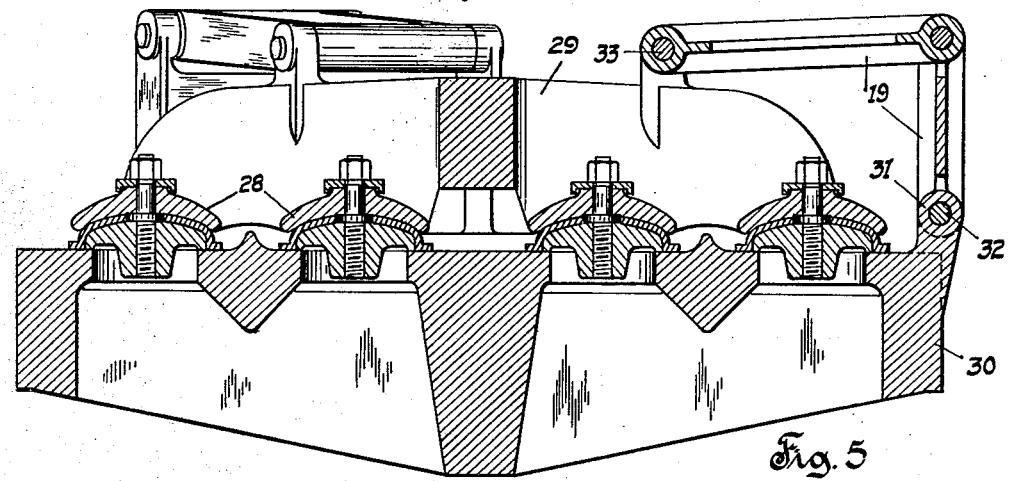
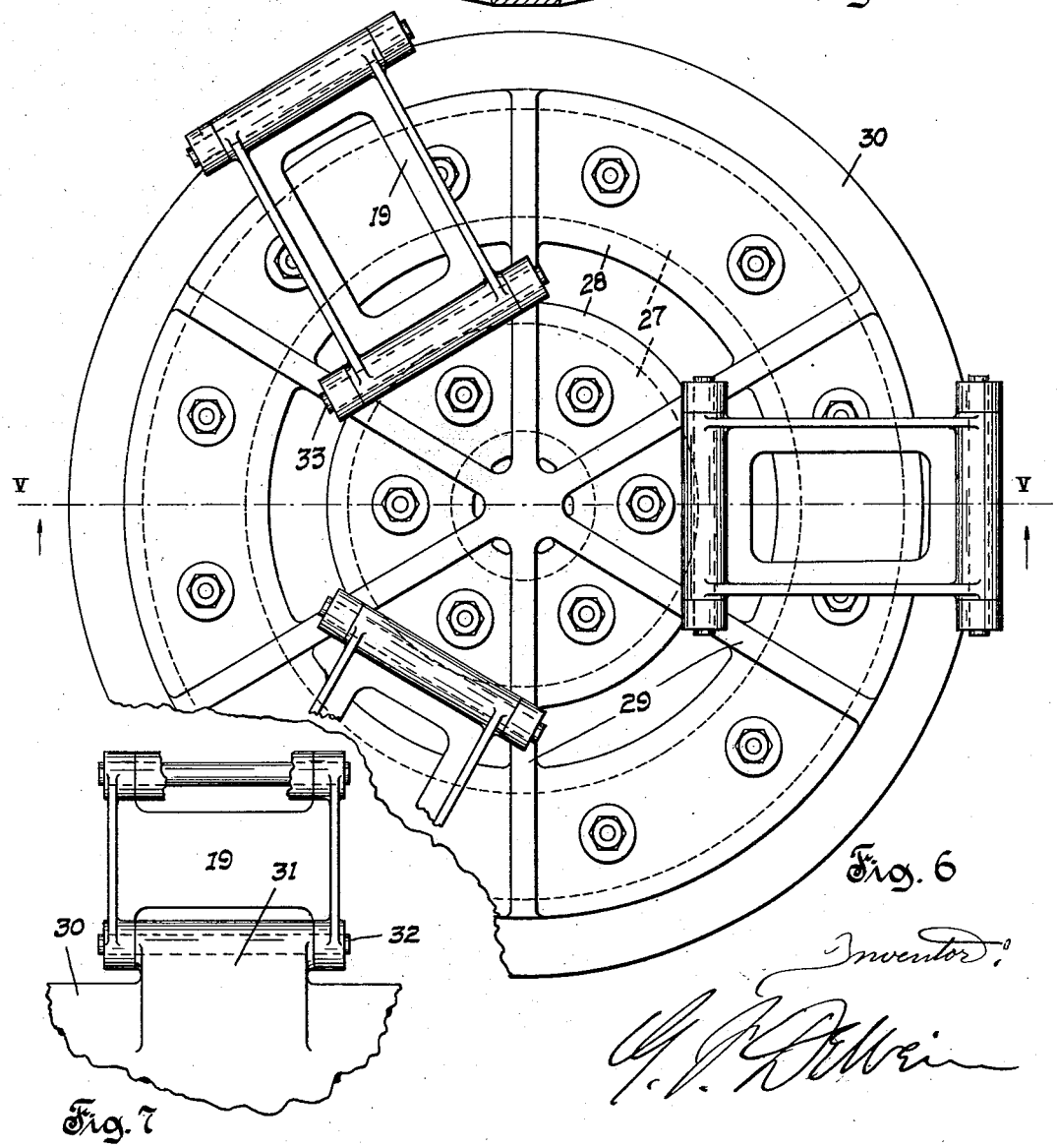
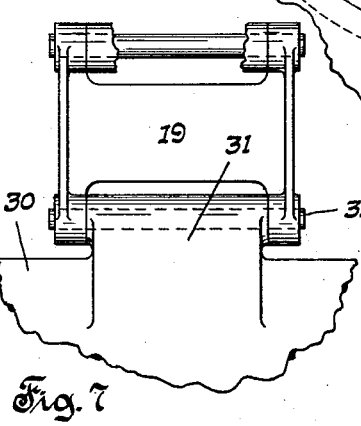

Patented July 6, 1926.

1,591,935

UNITED STATES PATENT OFFICE.

GEORGE F. DE WEIN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

POPPET VALVE.

Application filed April 25, 1921. Serial No. 464,339.

This invention relates to improvements in valves of large caliber compared to their length in the direction traveled, that are designed to meet the conditions present in the handling of great forces of water, steam, or other fluids that are to be regulated and controlled, as in public service stations, hydropower plants, reservoirs, and the like.

A general attribute of this invention is its applicability to valves in any angular position, irrespective of their weight, as this invention is such that it will be readily apparent to those versed in the art, that equally good results may be obtained for any angular position of the valve, as the mounting of the plunger in this valve structure will function efficiently for any given position of the valve, because the valve herein referred to is absolutely accurately guided by the pin-jointed structure without dependence upon conditions of bore.

This invention is applicable to a valve of this type, comprising an outer shell concentric about an inner bobbin-shaped assembly, the latter spaced from the said shell by radial ribs that leave an annular conduit of spider design within the shell and around the said assembly. The said assembly is provided with a flexibly retained, piston-like, horizontally disposed plunger or gate, forming the operative part of the aforesaid bobbin-like assembly.

In this type of valve one object of the invention is to offer a provision whereby a reciprocating element is constrained to "float" in preserving a straight line path of travel while having a motion of translation and thus preserve a position for any graduation between the opened and closed positions, which will offer an annular opening of equable area through its accuracy of balance and retained equilibrium by reason of constraining links. This provision avoids the wabbling effect which causes the binding and sticking that is now a detriment in present structures, because of the inability to assure equal distribution of the forces acting on the reciprocating element, and because of the relatively short length of same as compared to its diameter. The present makes of valves offer no stabilizing means other than the plunger's bore, which becomes nil at the extended position of the plunger on account of the reduced enveloping area of the bore around the plunger when so located, the said plunger being then exposed to the force of the flowing fluid that may vary around the projected portion of the plunger. In some cases the spider webs extend forward adjacent the discharge opening and serve as guides for the plungers, but even this does not alter the objectionable condition of the relatively short plunger compared to its diameter.

In this same type of valve, a further object of this invention, is to provide a means for stabilizing the plunger element by introducing a construction whose plural elements will function synchronously within a hollow chambered interior of the bobbin-like assembly without interfering with the mechanism that provides the actuating force necessary to operate the plunger, thereby utilizing a space that is now of no material consequence for housing an essential element that makes for higher efficiency without adding features that might detract from the valve's simplicity of operation. This construction offers no obstruction to the smooth conduit, with its gradual changes of direction, eminently requisite in valves of this kind.

In this type of valve an object also, is to construct a device where the obstruction offered to a flow therethrough, by the supporting ribs for the central bobbin shaped assembly, is minimized in providing a stabilizing means where it is possible to use a bored element of shorter length and to eliminate in doing so the extending of the supporting rib formation beyond the said bored element, thereby presenting an area adjacent the discharge opening free from elements that induce churning.

Of course, it is obvious that this invention is also applicable to valves in which there is no specific operating cylinder, but in which the plunger part of the valve and the cylindrical body in which the plunger operates, are differentially formed to provide the pressure between them for operating the plunger.

This invention is also applicable to a type of valve generally known as the "Riedler" valve. This is a valve which is made up of a number of rings that are connected into a unitary movable valve structure, per se, which coacts with a seat to close annular openings therein. When this invention is applied to such a Riedler valve, there need be no other means for guiding the valve to the annular seats than the pin-jointed toggle link structure forming the essential part of this invention.

A clearer conception of this invention may be obtained by referring to the drawings which form part of this specification, in which:—

Fig. 5 is a section on line V—V of Fig. 6.

Fig. 6 is a top plan of Fig. 5.

Fig. 7 is a fragmentary elevation of this improvement as same is applied to the modified form of valve illustrated in the said Figs. 5 and 6.

In the following detailed description, similar characters of reference are applied to like parts throughout the several views:—

Figure 1:
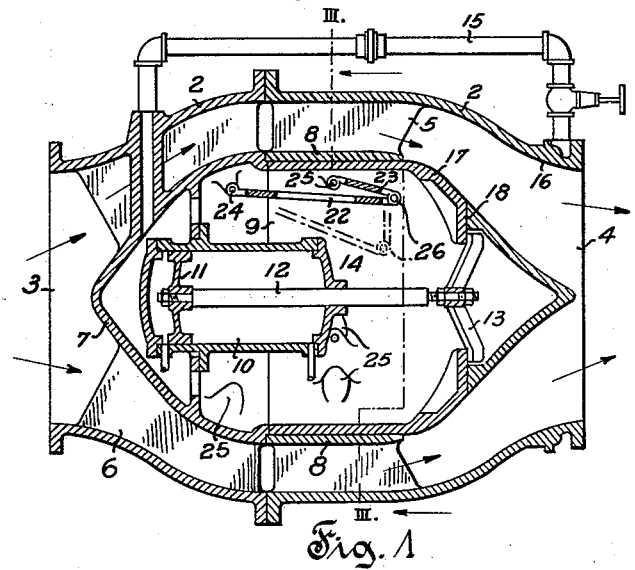
Fig. 1 is a longitudinal section through a valve, showing the valve open.
Figure 2:
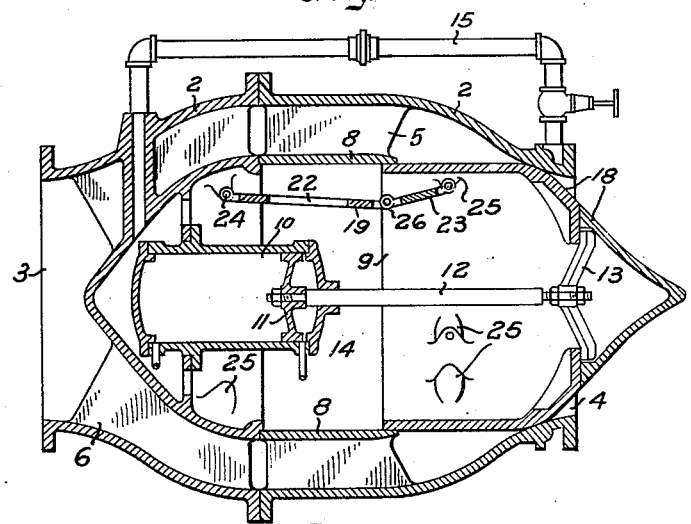
Fig. 2 is a similar section showing the valve closed.
Figure 3:
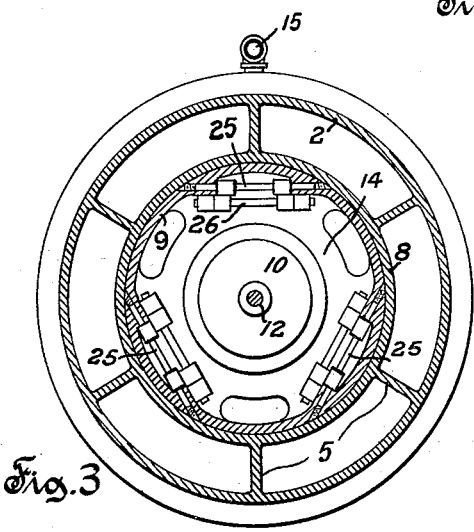
Fig. 3 is a section on line III—III of Fig. 1.

A valve body, preferably of plural construction, forming a casing 2 is designed to envelope a bobbin-shaped assembly, the latter maintained concentrically within the body 2 and axially alined with the contracted openings 3, 4 by means of the radial ribs 5, 6 that form the spacing elements which provide an annular conduit between the body aforesaid and the said assembly. The course of flow may be in either direction, as this form of valve functions similarly should conditions require a flow passing in opposition to that indicated by the arrows in Fig. 1, the said arrows serving in explanation of the present description.

The inner bobbin-shaped assembly is composed of several elements which offer a conical formation 7 and a cylinder 8, the said cylinder being concentric with the enlarged part of the valve body 2 and forming, with the conical member 7, the ribs 5, 6 and the casing 2, a stationary and integral unit. The cylinder 8 is bored to receive a piston-like plunger or valve gate 9 which reciprocates within the cylinder 8 under forces controlled by a thrust cylinder 10 provided with a piston 11, a rod 12 and a crosshead 13; or, by a force directed to an inner chamber 14 by the piping arrangement 15. The herein recited forces have separate values depending upon conditions and class of work performed, both phases however, are well known applications in the art affected.

A casing body 2 has a reverse curved conical end that is truncated to form, what is here termed, the inlet 3, a similar conical formation terminates with the discharge end opening 4. The inner conical surface of the discharge end has a contour that offers an annular valve seat 16 which coincides with a shoulder 17 annularly disposed about the base of a conical nose 18, the latter forming the outer closed end of the plunger 9 and within which the cross-head 13 is retained.

Figure 4:
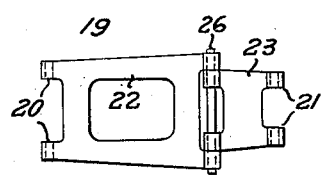
Fig. 4 is a detached view of a toggle arm member.

The conical member 7 and the sleeve cylinder 8, along with the plunger 9 form the bobbin-shaped assembly before mentioned, and provides a hollow chamber 14 within which operates a set of articulated guiding toggles 19 that are angularly opposite to each other and equidistantly spaced around the chamber aforesaid. The said toggles 19 (see Fig. 4) form flexible hinge units of sufficient breath to enable the apertured forked ends 20, 21 of their respective long and short leaves 22, 23 to accommodate the chordal pivoting pins 24 between lugs 25. The said pins being disposed at right angles to the radial centers of the toggles 19 describe chords of the cylindrical members 7, 9 to which the said toggles are respectively attached. The toggles 19 are provided with articulated joints or knuckles 26 and are disposed so as to allow the said knuckles to break radially inward upon the reciprocation of the plunger 9 and to preserve an inwardly flexed tendency when the plunger is fully extended. The long leaf 22, being pivotally connected to the stationary member 7 and the short leave 23 similarly connected to the reciprocating plunger 9, disposes the toggles 19 where the angles described in breaking will always clear any mechanical aggregations necessarily required within the chamber 14, as illustrated by dotted lines in Fig. 1.

The chordal mounting of the toggles aforesaid offers a stabilizing feature which permits of shortening the bored cylinder 8 to a minimum length and incidentally obviates the necessity of extending the radial ribs 5 beyond the member 8, thus providing a clear and open converging area, free from the obstructions that are necessarily required in many of the valves heretofore employed.

Figs. 5, 6 and 7 illustrate the application of this invention to the modified form of valve referred to above. This structure has the concentrical valve apertures 27 that are opened or closed by circular covers or gates 28; symmetrically spaced, integral with and tangent to the outer flanged circle of a valve body 30, are formed suitable lugs 31 to pivotally receive one end of the toggles 19 and the pins 32, the other end of said toggles being pivoted as shown to ribs 29 by means of the pins 33. The said pins 32 are now in tangential relation to the valve cover 28 and body 30, which condition prevents oscillation of the cover 28 by constraining the said cover from moving in any direction other than that which will be axially alined with the concentric valve openings aforesaid, causing the action of this valve to be positive and even in action.

The operation of the valve with this improvement is similar in some essentials to those already in the field. Considering the course as per arrows in Fig. 1, the full flow or head passes through the inlet 3, through the annularly expanded conduit which envelopes the bobbin-like assembly and discharges through the opening 4. Openings 3, 4, in practice, are connected to suitable lead and discharge conduits not here shown. As conditions require, the opening 4 must be throttled at times medially between its opened and closed condition, in this position the gate or plunger 9 is exposed to powerful vibration due to the rush of the converging water passing through the valve and the discharge opening 4. This force acting upon the projected plunger is withstood by virtue of the chordally or tangentially mounted toggles 19 that maintain the plunger in its perfect sustained axial relationship, providing a constant opening or equal annular area for any given medial position, besides maintaining the plunger 9 in perfect balance. This invention insures an accurate and simultaneous contact of the shoulders 17 with the seat 16 at all points of the circumference when a closed position is desired, by preventing any wabbling of the said plunger while in a medial location, obviating in this way all the wear consequent to said wabbling and loosening, through frictional disintegration, which multiplies the allowable play and aggravates the conditions so detrimental to the efficient operation of large valve assemblies.

The pivoting of the toggles 19 and the breath of the leaves that form the said toggles, permits of using pins that occupy chordal relationships to the cylindrical members through which the said pins pass. Thus is assured absolute protection against any torsional tendency of the plunger 9 to rotate in the cylindrical member 8 under stress of the whirl and flow of water passing over its exposed conical surface or nose 18. This structure, due to the angular spacing of the toggles 19, serves to constrain the plunger 9 to remain in accurate longitudinally alinement with the cylinder 8 maintaining, thereby a centering of parts axially coincident for any graduation of opening desired.

The maintenance of balance desired in the plunger element is assured under this invention by virtue of the toggle arrangement which is positive in action and combines a stabilization of structure with a flexibility of movement making for responsiveness to the conditions at hand while offering a simplicity of design that is simple to manufacture and durable in service.

It should be understood that it is not desired to limit the invention to the exact details of construction herein shown and described, for obvious modifications within the scope of the appended claims may occur to a person skilled in the art.

It is claimed and desired to secure by Letters Patent:—

1. In a valve body, a valve opening, a piston functioning as a gate for said opening, and toggle arms for guiding the piston aforesaid.

2. A valve having an aperture adapted to be opened and closed by a gate, said gate being maintained in accurate alinement with said aperture by a plurality of articulated elements functioning independently of an opening or closing mechanism.

3. In a valve, a body portion having a bore, a piston plunger operable in said bore and functioning as a reciprocating gate, and a plurality of guiding elements articulated with the said body portion and plunger and functioning to guide said body independently of said bore.

4. In a valve construction, an operable gate member, a stationary member, and angularly spaced guiding toggles connecting said gate member and said stationary member, the said toggles disposed to radially converge inwardly upon the withdrawal or extension of the operable member aforesaid.

5. In combination, a casing having an annular seat, a valve body cooperable with said seat, and a plurality of sets of articulated elements connecting said body and said casing, said sets of elements being formed to invariably move said body along the axis of annularity of said seat and being articulatable in intersecting planes.

6. In combination, a cylindrical valve body, a cylindrical valve gate, articulated guide members pivotally attached to said body and said gate, pivot pins for said members, and means for locating said pins to assume chordal relation to the cylindrical shape of the body and gate aforesaid.

7. In combination, concentric walls, radial ribs connecting said walls, the said ribs and said inner wall being coextensive, a plunger slidable within said inner wall, and a plurality of articulated elements for guiding said plunger beyond the limits of the length of said inner wall and ribs.

8. In a valve, a cylindrically formed longitudinally reciprocable valve member, and toggle connections disposed longitudinally and symmetrically angularly spaced with reference to said valve member whereby said valve member may have relative longitudinal reciprocation in a straight line motion of translation.

9. A valve guided by a plurality of toggles each comprising two elements of different lengths said elements having their greater portion pivotally anchored to a stationary structure and their lesser portion pivotally anchored to a reciprocating member whereby space is provided adjacent to greater portions of said elements for other operating structure.

10. In combination, a valve body having a hollow central assembly, angularly spaced articulated members within the said assembly, operable means guided by said members, and thrust means for actuating the operabe means, both said means coaxially mounted, the said articulated members and means aforesaid functioning synchronously.

11. In combination, stabilizing guiding elements symmetrically angularly spaced within a chamber, and pivot pins for connecting the said elements to stationary and movable portions forming the said chamber, the said pins positioned to lie tangent to a common circle.

12. In combination, a hollow valve structure, a hollow reciprocating piston, inwardly disposed lugs formed within said structure and said piston, and at least two sets of toggle arms the arms of each set being articulated together and to said lugs and located within the hollow structure and piston.

13. In a valve structure, a casing having a bore, a piston reciprocable within said bore, and toggles in at least two sets connecting said casing and piston, said toggles being broad at their pivot connections measured longitudinally of their pivots as compared to the length of an arm of said toggles.

14. A valve comprising a body having a guiding wall therein and a plunger slidable within said wall, and a plurality of toggles for rectilineally guiding said plunger during movement beyond the end of said wall.

15. In combination, a casing having an annular seat, a valve body having a nose movable beyond the plane of said seat, and a plurality of sets of articulated elements connecting said body and said casing, said sets of elements being formed to invariably move said nose along the axis of annularity of said seat and being articulatable in intersecting planes.

16. In combination, a casing having an annular seat therewithin, a valve body within said casing and having portions disposed on opposite sides on the plane of said seat when said valve is closed, and a plurality of toggles connecting said body and said casing, said toggles being formed to invariably move said body along the axis of annularity of said seat and being movable in intersecting planes.

17. In combination, a casing having an annular seat, a valve body having a nose movable beyond the plane of said seat, and a plurality of toggles connecting said body and said casing, said toggles being disposed in intersecting planes and being formed to invariably move said nose along the axis of annularity of said seat.

In testimony whereof, the signature of the inventor is affixed hereto.

G. F. DE WEIN.